US010961416B2

(12) United States Patent
Song et al.

(10) Patent No.: US 10,961,416 B2
(45) Date of Patent: Mar. 30, 2021

(54) SEMI-HARDENED PRESSURE-SENSITIVE ADHESIVE FILM

(71) Applicant: LG Chem, Ltd., Seoul (KR)

(72) Inventors: Min-Seok Song, Anyang-si (KR); Chan-Oh Yoon, Cheongju-si (KR); Eun-Kyung Park, Seoul (KR); Bu-Gi Jung, Anyang-si (KR); Jang-Soon Kim, Seongnam-si (KR)

(73) Assignee: LG Chem, Ltd.

( * ) Notice: Subject to any disclaimer, the term of this patent is extended or adjusted under 35 U.S.C. 154(b) by 80 days.

(21) Appl. No.: 14/386,980

(22) PCT Filed: Apr. 8, 2013

(86) PCT No.: PCT/KR2013/002926
§ 371 (c)(1),
(2) Date: Sep. 22, 2014

(87) PCT Pub. No.: WO2013/154314
PCT Pub. Date: Oct. 17, 2013

(65) Prior Publication Data
US 2015/0044458 A1 Feb. 12, 2015

(30) Foreign Application Priority Data
Apr. 10, 2012 (KR) .................. 10-2012-0037568

(51) Int. Cl.
C09J 7/00 (2018.01)
G02B 1/04 (2006.01)
C09J 7/10 (2018.01)
C09J 133/08 (2006.01)
C09J 163/00 (2006.01)
C09J 175/14 (2006.01)

(52) U.S. Cl.
CPC ............. *C09J 7/10* (2018.01); *C09J 133/08* (2013.01); *C09J 163/00* (2013.01); *G02B 1/04* (2013.01); *C09J 175/14* (2013.01); *C09J 2203/318* (2013.01); *C09J 2301/302* (2020.08); *C09J 2433/00* (2013.01); *C09J 2459/00* (2013.01); *C09J 2463/00* (2013.01); *C09J 2475/00* (2013.01); *Y10T 428/2891* (2015.01)

(58) Field of Classification Search
None
See application file for complete search history.

(56) References Cited

U.S. PATENT DOCUMENTS

| 4,717,605 A * | 1/1988 | Urban ............... C03C 27/10 156/273.5 |
| 4,731,620 A * | 3/1988 | Yabe .................. G11B 7/24015 346/137 |
| 5,521,227 A | 5/1996 | Palazzotto et al. |
| 5,589,554 A * | 12/1996 | Hiraoka ................. C09J 4/00 525/530 |
| 6,376,070 B1 | 4/2002 | Nakasuga et al. |
| 2003/0026979 A1 | 2/2003 | Nakasuga et al. |
| 2003/0232192 A1* | 12/2003 | Kishioka .............. C09J 7/38 428/354 |
| 2004/0186195 A1 | 9/2004 | Suzuki et al. |
| 2004/0191509 A1* | 9/2004 | Kishioka ............... B32B 7/10 428/354 |
| 2005/0244633 A1* | 11/2005 | Kobayashi ........... C09J 133/14 428/355 R |
| 2006/0044993 A1* | 3/2006 | Hongo ................ G11B 7/24056 369/272.1 |
| 2007/0295446 A1 | 12/2007 | Behr et al. |
| 2011/0223743 A1 | 9/2011 | Saito et al. |
| 2014/0256841 A1 | 9/2014 | Kim et al. |

FOREIGN PATENT DOCUMENTS

| CN | 1170747 A | 1/1998 |
| CN | 1513884 A | 7/2004 |
| CN | 103890126 A | 6/2014 |
| JP | 63-193980 | 8/1988 |
| JP | S63193980 A | 8/1988 |
| JP | H5-506465 A | 9/1993 |
| JP | 07-126350 A | 5/1995 |
| JP | H07126350 A | 5/1995 |
| JP | 1997279103 | 10/1997 |
| JP | 2002271001 A | 9/2002 |

(Continued)

OTHER PUBLICATIONS

Chinese Office Action dated Sep. 25, 2015 in connection with the counterpart Chinese Patent Application No. 201380019202.4, citing the above reference(s).

(Continued)

*Primary Examiner* — Anish P Desai
*Assistant Examiner* — Thomas A Mangohig
(74) *Attorney, Agent, or Firm* — Lerner, David, Littenberg, Krumholz & Mentlik, LLP

(57) ABSTRACT

Disclosed is a semi-hardened pressure sensitive adhesive film to be used in the semi-hardened state and having excellent printing step absorption properties. The adhesive film according to the present invention contains a radial polymer composition and a cationic polymer composition, and the radial polymer composition is primarily cross-linked to maintain the semi-hardened state. When applied onto a substrate through a printing step, the present invention has excellent step absorption properties and adhesion properties and excellent durability even under high-temperature and high-humidity conditions.

5 Claims, No Drawings

(56) References Cited

FOREIGN PATENT DOCUMENTS

| | | |
|---|---|---|
| JP | 2009127023 A | 6/2009 |
| JP | 2012062471 A | 3/2012 |
| KR | 20010016674 A | 3/2001 |
| KR | 20020030852 A | 4/2002 |
| KR | 20090018100 A | 2/2009 |
| KR | 20110029769 A | 3/2011 |
| KR | 20110069462 A | 6/2011 |
| KR | 20110099106 A | 9/2011 |

OTHER PUBLICATIONS

Korean Notice of Allowance dated Dec. 29, 2014, citing the above reference(s).
International Search Report for PCT/KR2013/002926 dated Jun. 25, 2013, citing the above reference(s).

* cited by examiner

SEMI-HARDENED PRESSURE-SENSITIVE ADHESIVE FILM

CROSS REFERENCE TO RELATED APPLICATION

This application claims the priority of Korean Patent Application No. 10-2012-0037568 filed on Apr. 10, 2012 in the Korean Patent and Trademark Office. Further, this application is the National Phase application of International Application No. PCT/KR2013/002926 filed on Apr. 8, 2013, which is incorporated herein by reference in its entirety.

TECHNICAL FIELD

The present invention relates to a semi-cured pressure-sensitive adhesive film, and more particularly, to an adhesive film exhibiting excellent print step absorption when applied to an optical member such as a touch panel.

BACKGROUND ART

A terminal including a touch panel or a touchscreen has a structure, in which a film prepared by forming a conductive thin film, such as indium tin oxide (ITO) and the like, on one surface of a transparent conductive plastic film, such as a polyethylene terephthalate film, used as a substrate is stacked on a conductive glass sheet, a reinforcing material, a decorative film or the like via an adhesive film, to achieve light weight and breakage prevention.

Techniques related to pressure-sensitive adhesive films are disclosed in various documents including Korean Patent Publication No. 10-2001-0016674. In particular, the adhesive film used in attachment of the transparent conductive film requires properties such as step absorption for absorbing print steps due to a decorative film, durability for suppressing curling, bubbling or the like upon exposure to severe conditions such as high temperature or high humidity, cuttability for suppressing protrusions or indentations upon cutting, excellent adhesion to various substrates, and the like, and also requires various other properties such as optical properties, workability, bending resistance and the like.

Currently, an adhesive film used in an optical member such as a touch panel is used in film form prepared by curing a composition including an acrylic polymer resin and the like. The adhesive film is applied to a substrate having print steps, and the like. Here, if the adhesive film does not exhibit sufficient step absorption for absorbing the print steps, it is difficult for the adhesive film to exhibit sufficient adhesion capability, thereby causing a problem in product durability.

Existing adhesive films are applied after an acrylic resin and the like are completely cured, and thus have a problem of insufficient step absorption.

DISCLOSURE

Technical Problem

It is an aspect of the present invention to provide an adhesive film applicable in a semi-cured state so as to obtain sufficient print step absorption.

Technical Solution

In accordance with one aspect of the present invention, an adhesive film includes a radical polymerizable composition and a cation polymerizable composition, wherein the adhesive film is maintained in a semi-cured state by primary crosslinking of the radical polymerizable composition.

Advantageous Effects

According to the present invention, there are advantages in that the adhesive film exhibits excellent step absorption when applied to a substrate having a print step, outstanding adhesion, and excellent durability even under high temperature or high humidity conditions.

BEST MODE

The above and other aspects, features and advantages of the present invention will become apparent from the detailed description of the following embodiments in conjunction with the accompanying drawings. However, it should be understood that the present invention is not limited to the following embodiments and may be embodied in different ways, and that the embodiments are provided for complete disclosure and thorough understanding of the invention by those skilled in the art. The scope of the invention should be defined only by the accompanying claims and equivalents thereof.

Hereinafter, exemplary embodiments of the present invention will be described in detail.

According to the present invention, an adhesive film is formed of a resin composition including a radical polymerizable composition and a cation polymerizable composition as a main component. In particular, the adhesive film according to the present invention is maintained in a semi-cured state by primary crosslinking of the radical polymerizable composition in the composition.

According to the present invention, since the adhesive film can be used in a semi-cured state, the adhesive film is softer than existing adhesive films used in a completely cured state. Therefore, the adhesive film according to the present invention exhibits excellent step absorption by absorbing a print step formed on a substrate.

According to the present invention, the radical polymerizable composition corresponding to a primarily crosslinked material in the adhesive film may be any composition without limitation so long as the composition can be polymerized and crosslinked into a polymer by free radicals. Preferably, the radical polymerizable composition is a material including a compound having at least one unsaturated double bond and a photopolymerization initiator.

Examples of the compound having at least one unsaturated double bond may include acrylic compounds such as acrylic monomers, acrylic prepolymers, and the like. The acrylic prepolymers may include at least one of urethane acrylates, polyester acrylates, epoxy acrylates, melamine acrylates, polyfluoroalkyl acrylates, silicone acrylates, and the like. According to the present invention, the radical polymerizable composition may include the acrylic prepolymer alone, or may include an acrylic monomer together with the acrylic prepolymer, as needed.

The acrylic monomers may include monofunctional acrylic monomers and polyfunctional acrylic monomers. Examples of the monofunctional acrylic monomers may include 2-ethylhexyl acrylate, 2-hydroxyethyl acrylate, 2-hydroxypropyl acrylate, butoxyethyl acrylate, and the like. Examples of bifunctional acrylic monomers may include 1,6-hexanediol diacrylate, neopentyl glycol diacrylate, diethylene glycol diacrylate, polyethylene glycol diacrylate, hydroxypivalic acid ester neopentyl glycol diacrylate, and the like. Examples of tri or higher-functional acrylic monomers may include dipentaerythritol hexaacrylate, trimethylolpropane triacrylate, pentaerythritol triacrylate, and the like. As used herein, the term "acrylate" may include acrylates and methacrylates. These acrylic monomers may be used alone or in combination thereof.

According to the present invention, examples of the photopolymerization initiator used in radical polymerization may include acetophenone, benzophenone, Michler's ketone, benzoin, benzylmethylketal, benzoyl benzoate, α-acyloxime ester, thioxanthones, and the like, without being limited thereto.

According to the present invention, the cation polymerizable composition corresponding to a secondarily crosslinked material in the adhesive film may be any composition without limitation so long as the composition can be polymerized and crosslinked by cations. Preferably, the cation polymerizable composition includes a cation polymerizable compound and a cation polymerization initiator, and the cation polymerizable compound includes at least one of epoxy resins and vinyl ether resins. For example, the epoxy resins may include bisphenol-based epoxy resins, novolac type epoxy resins, alicyclic epoxy resins, aliphatic epoxy resins, and the like. The ether resins may be a resin including polyfunctional alkyl glycidyl ether monomers, and may include, for example, neopentyl glycol diglycidyl ether, dipropylene glycol diglycidyl ether, trimethylolpropane triglycidyl ether, and the like.

Examples of the cation polymerization initiator may include anionic compounds, such as aromatic sulfonium ions, aromatic oxosulfonium ions, aromatic iodonium salts, tetrafluoroborate, hexafluorophosphate, hexafluoroantimonate, hexafluoroarsenate, and the like. These may be used alone or in combination thereof.

As described above, the adhesive film according to the present invention includes the radical polymerizable composition and the cation polymerizable composition, and is semi-cured by primary crosslinking of the radical polymerizable composition. According to the present invention, the adhesive film is used in a semi-cured state, and attached to a substrate or the like having a print step height from 5 μm to 50 μm. Further, in order to completely bond the adhesive film to the substrate, the cation polymerizable composition is subjected to secondary crosslinking. Since the cation polymerizable composition is subjected to secondary crosslinking, the adhesive film is completely cured in a state of being attached to the substrate, and thus is completely bonded thereto.

According to the present invention, the adhesive film may be semi-cured by primary crosslinking and then completely cured by secondary crosslinking through UV irradiation, without being limited thereto.

According to the present invention, the adhesive film is semi-cured by primary crosslinking of the radical polymerizable composition, and primary crosslinking of the radical polymerizable composition may be performed through UV irradiation at an irradiance from 1 mW/cm$^2$ to 10 mW/cm$^2$. If the UV irradiance is less than 1 mW/cm$^2$, the radical polymerizable composition cannot be sufficiently crosslinked, and if the UV irradiance is greater than 10 mW/cm$^2$, the adhesive film can be excessively cured rather than semi-cured.

After the semi-cured adhesive film is attached to the substrate, the adhesive film is completely cured such that the adhesive film is completely bonded to the substrate. Here, the adhesive film is completely cured by secondary crosslinking of the cation polymerizable composition. Like primary crosslinking, secondary crosslinking of the cation polymerizable composition may also be performed through UV irradiation at an irradiance from 50 mW/cm$^2$ to 150 mW/cm$^2$. If the UV irradiance is less than 50 mW/cm$^2$, the cation polymerizable composition cannot be sufficiently crosslinked, and if the UV irradiance is greater than 150 mW/cm$^2$, the adhesive film can be deformed.

According to the present invention, the adhesive film may be used in optical members such as touch panels, display panels, and the like, without being limited thereto. The adhesive film may be used for any purposes requiring print step absorption without limitation.

Hereinafter, the present invention will be explained in more detail with reference to some examples. However, it should be understood that these examples are not to be in any way construed as limiting the present invention.

EXAMPLES AND COMPARATIVE EXAMPLES

To confirm print step absorption and durability of an adhesive film according to the present invention, adhesive films of Examples and Comparative Examples were prepared, and evaluated as to the following properties.

Each of materials for adhesive films including mixtures having compositions as listed in Table 1 was coated to a thickness of 10 μm onto a 50 μm thick PET release film.

TABLE 1

|  | Radical polymerizable composition | Cation polymerizable composition | Composition ratio |
|---|---|---|---|
| Example 1 | 1) Acrylic resin (urethane acrylate): 100 parts by weight<br>2) Irgacure 184: 1 part by weight | 1) Epoxy resin: 100 parts by weight<br>2) Aromatic iodonium salt: 1 part by weight | 1:1 |
| Example 2 | 1) Acrylic resin (polyester acrylate): 100 parts by weight<br>2) Irgacure 184: 1 part by weight | 1) Epoxy resin: 100 parts by weight<br>2) Aromatic iodonium salt: 1 part by weight | 1:1 |
| Example 3 | 1) Acrylic resin (urethane acrylate, 2-ethylhexyl acrylate): 100 parts by weight<br>2) Irgacure 184: 1 part by weight | 1) Vinyl ether resin: 100 parts by weight<br>2) Aromatic iodonium salt: 1 part by weight | 1:1 |
| Example 4 | 1) Acrylic resin (melamine acrylate, 2-hydroxyethyl acrylate): 100 parts by weight<br>2) Irgacure 184: 1 part by weight | 1) Vinyl ether resin: 100 parts by weight<br>2) Aromatic iodonium salt: 1 part by weight | 1:1 |
| Example 5 | 1) Acrylic resin (epoxy acrylate, pentaerythritol triacrylate): 100 parts by weight<br>2) Irgacure 184: 1 part by weight | 1) Vinyl ether resin: 100 parts by weight<br>2) Aromatic iodonium salt: 1 part by weight | 1:1 |

TABLE 1-continued

|  | Radical polymerizable composition | Cation polymerizable composition | Composition ratio |
|---|---|---|---|
| Comparative Example 1 | 1) Acrylic resin (urethane acrylate, 2-ethylhexyl acrylate): 100 parts by weight<br>2) Irgacure 184: 1 part by weight | — | — |
| Comparative Example 2 | — | 1) Epoxy resin: 100 parts by weight<br>2) Aromatic iodonium salt: 1 part by weight | — |

Adhesive films of Examples 1 to 5 and Comparative Example 1 were cured by UV irradiation at an irradiance from 1 mW/cm² to 10 mW/cm², and an adhesive film of Comparative Example 2 was cured by UV irradiation at an irradiance from 50 mW/cm² to 150 mW/cm².

The adhesive films of Examples were formed in a semi-cured state, whereas the adhesive films of Comparative Examples were formed in a complete cured state.

EVALUATION

1. Adhesive Strength

Each of the adhesive films of Examples and Comparative Examples was evaluated as to adhesive strength (unit: g/in). Adhesive strength of the adhesive film to a glass substrate was evaluated. The adhesive film having an adhesive strength of 100 g/in or more was rated as O, and the adhesive film having an adhesive strength of less than 100 g/in was rated as X. Results are shown in Table 2.

2. Storage Modulus

Each of the adhesive films of Examples and Comparative Examples was evaluated as to storage modulus (unit: Pa). Storage modulus was measured at 30° C. and at 100° C. using a storage modulus tester (ARES G2).

3. Print Step Absorption

Each of the adhesive films of Examples and Comparative Examples was bonded to a glass substrate having a print step height from 5 μm to 50 μm, followed by evaluation of step absorption. Step absorption was evaluated based on whether the adhesive film suffered from detachment or bubbling. The adhesive film, which suffered from almost no detachment and bubbling and thus was determined to exhibit excellent step absorption, was rated as "O", and the adhesive film suffering from significant detachment or bubbling was rated as "X". Results are shown in Table 2.

TABLE 2

|  | Adhesive strength | Storage modulus (Pa) 30° C. | Storage modulus (Pa) 100° C. | Step absorption |
|---|---|---|---|---|
| Example 1 | O | 10,100 | 1,012 | O |
| Example 2 | O | 10,082 | 1,055 | O |
| Example 3 | O | 10,141 | 1,120 | O |
| Example 4 | O | 10,155 | 1,040 | O |
| Example 5 | O | 10,077 | 1,023 | O |
| Comparative Example 1 | O | 100,000 | 100,000 | X |
| Comparative Example 2 | O | 8,0000 | 8,000 | X |

In the evaluation results of Table 2, it can be seen that all of the adhesive films of Examples and Comparative Examples exhibited high adhesive strength to the glass substrate.

In addition, as a result of measurement of storage modulus of the adhesive films of Examples and Comparative Examples, the adhesive films of Examples had a storage modulus near 10,000 Pa at 30° C.

In particular, it could be seen that the adhesive films of Examples exhibited excellent flowability due to relatively low storage modulus at room temperature, and it could be anticipated that the adhesive films of Examples would exhibit excellent step absorption.

Conversely, the adhesive films of Comparative Examples had an extremely high storage modulus at 30° C. That is, it could be sufficiently anticipated that the adhesive films of Comparative Examples would exhibit poor step absorption due to poor flowability at room temperature.

Next, step absorption of the adhesive films of Examples and Comparative Examples was evaluated. Since the adhesive films of Examples suffered from almost no detachment and bubbling when applied to a substrate having a print step, the adhesive films of Examples were evaluated as exhibiting excellent print step absorption, as anticipated above. Conversely, the adhesive films of Comparative Examples suffered from detachment and bubbling due to poor print step absorption.

It could be seen that, since the adhesive films of Examples were softer than those of Comparative Examples due to a semi-cured state and exhibited rapid reduction in storage modulus with increasing temperature from low temperature to high temperature, the adhesive films of Examples exhibited excellent print step absorption.

Although the present invention has been described with reference to some embodiments, it should be understood that the foregoing embodiments are provided for illustrative purposes only, and that various modifications, changes, alterations, and equivalent embodiments can be made by those skilled in the art without departing from the spirit and scope of the invention. Therefore, the scope of the invention should be defined only by the accompanying claims and equivalents thereof.

The invention claimed is:

1. A touch panel comprising an adhesive film comprising a semi-cured adhesive composition and a substrate having a print step height from 5 μm to 50 μm,
   wherein the semi-cured adhesive composition comprises a primarily crosslinked radical polymerizable composition comprising a compound having at least one unsaturated double bond and a photopolymerization initiator,
   the compound having at least one unsaturated double bond comprises at least one of acrylic monomers and acrylic prepolymers, and
   cation polymerizable composition comprising a cation polymerizable compound and a cation polymerization initiator,
   wherein the ratio of the radical polymerizable composition to the cation polymerizable composition is 1:1,
   wherein the cation polymerizable compound comprises at least one of epoxy resins or vinyl ether resins, wherein the photopolymerization initiator is activated upon UV irradiation of from 1 mW/cm$^2$ to 10 mW/cm$^2$, and the cation polymerization initiator is activated upon UV irradiation of from 50 mW/cm$^2$ to 150 mW/cm$^2$, and wherein the cation polymerization initiator comprises at least one of aromatic oxosulfonium ions and aromatic iodonium salts.

2. The touch panel according to claim 1,
wherein the radial polymerizable composition is cross-linked by UV irradiation and irradiance from 1 mW/cm$^2$ to 10 mW/cm$^2$.

3. The touch panel according to claim 1,
wherein the photopolymerization initiator comprises at least one of acetophenone, benzophenone, Michler's ketone, benzoin, benzylmethylketal, benzoyl benzoate, α-acyloxime ester, and thioxanthone initiators.

4. The touch panel according to claim 1,
wherein the adhesive film has an adhesive strength of 100 g/in or more.

5. The touch panel according to claim 1,
wherein at least one of the acrylic monomers and acrylic prepolymers is selected from at least one of 2-ethylhexyl acrylate, 2-hydroxyethyl acrylate, 2-hydroxypropyl acrylate, butoxyethyl acrylate, 1,6-hexanediol diacrylate, neopentyl glycol diacrylate, diethylene glycol diacrylate, polyethylene glycol diacrylate, hydroxypivalic acid ester neopentyl glycol diacrylate, dipentaerythritol hexaacrylate, trimethylolpropane triacrylate, pentaerythritol triacrylate, urethane acrylates, polyester acrylates, epoxy acrylates, melamine acrylates, polyfluoroalkyl acrylates, or silicone acrylates.

\* \* \* \* \*